(12) United States Patent
Lutz

(10) Patent No.: US 11,807,069 B2
(45) Date of Patent: Nov. 7, 2023

(54) ELECTRICALLY DRIVEN MOTOR VEHICLE

(71) Applicant: Mahle International GmbH, Stuttgart (DE)

(72) Inventor: Rainer Lutz, Steinheim (DE)

(73) Assignee: Mahle International GmbH

(*) Notice: Subject to any disclaimer, the term of this patent is extended or adjusted under 35 U.S.C. 154(b) by 56 days.

(21) Appl. No.: 17/522,815

(22) Filed: Nov. 9, 2021

(65) Prior Publication Data
US 2022/0194164 A1 Jun. 23, 2022

(30) Foreign Application Priority Data

Nov. 4, 2020 (DE) .................. 10 2020 213 895.8
Mar. 29, 2021 (DE) .................. 10 2021 203 125.0

(51) Int. Cl.
| | | |
|---|---|---|
| B60H 3/00 | (2006.01) | |
| B60H 1/00 | (2006.01) | |
| B60H 1/32 | (2006.01) | |
| B60K 11/02 | (2006.01) | |
| B60K 1/00 | (2006.01) | |

(52) U.S. Cl.
CPC ..... B60H 1/00278 (2013.01); B60H 1/00385 (2013.01); B60H 1/323 (2013.01); B60K 11/02 (2013.01); *B60H 2001/00307* (2013.01); *B60K 2001/005* (2013.01); *B60K 2001/008* (2013.01)

(58) Field of Classification Search
CPC ........................ B60H 1/00278; B60H 1/00385; B60H 1/323; B60H 2001/00307; B60K 11/02; B60K 2001/005; B60K 2001/008
USPC .......................................................... 165/42
See application file for complete search history.

(56) References Cited

U.S. PATENT DOCUMENTS 6,569,550 B2   5/2003  Khelifa
2017/0174039 A1* 6/2017  Schedel .................. H02P 29/62

FOREIGN PATENT DOCUMENTS

| CN | 107331221 A | * 12/2017 |
| DE | 196 61 825 | 6/2001 |
| DE | 19961825 A1 | 6/2001 |
| DE | 102018122702 A1 | 3/2020 |
| DE | 102018219824 A1 | 5/2020 |

(Continued)

OTHER PUBLICATIONS

German Search Report dated Mar. 17, 2022 for copending German Patent App. No. DE 10 2021 203 125.0.

*Primary Examiner* — Davis D Hwu
(74) *Attorney, Agent, or Firm* — Fishman Stewart PLLC

(57) ABSTRACT

An electrically driven motor vehicle may include a first cooling circuit, a first component, a first heat exchanger, at least one pump configured to convey a coolant, a second cooling circuit, and a second component. The first component may be arranged in the first cooling circuit and may have a temperature which is to be controlled. The second component may be arranged in the second cooling circuit and may have a temperature which is to be controlled. The first cooling circuit and the second cooling circuit may be fluidically separated from one another and may be coupled to one another to transfer heat via a second heat exchanger. One of (i) the first component and (ii) the second component may be configured as at least one of an electrical energy storage and a fuel cell module, and the other may be configured as a secondary braking system.

20 Claims, 2 Drawing Sheets

(56) References Cited

FOREIGN PATENT DOCUMENTS

| | | |
|---|---|---|
| KR | 20210115909 A | 9/2021 |
| WO | 2020185138 A1 | 9/2020 |

* cited by examiner

ELECTRICALLY DRIVEN MOTOR VEHICLE

CROSS-REFERENCE TO RELATED APPLICATIONS

This application claims priority to German Patent Application No. DE 10 2020 213 895.8, filed on Nov. 4, 2020, and German Patent Application No. DE 10 2021 203 125.0, filed on Mar. 29, 2021, the contents of both of which are hereby incorporated by reference in their entirety.

TECHNICAL FIELD

The present invention relates to an electrically driven motor vehicle comprising a first cooling circuit and a second cooling circuit.

BACKGROUND

A generic, electrically driven motor vehicle comprising a cooling-heating circuit comprising at least two partial circuits, in which different temperature are present at least in some sections and which each include a radiator in order to cool at least one aggregate each, wherein the partial circuits are fluidically coupled to one another, is known from DE 196 61 825 A1.

In the case of medium and also heavy-duty commercial vehicles, so-called secondary braking systems are typically used today, which, on the one hand, leads to the compliance with legal requirements and, on the other hand, is used to reduce maintenance costs because secondary braking systems, such as, for example, engine brakes or retarders, operate virtually wear-free. The use of engine brakes can be forgone in the case of electric vehicles or electrified drive trains, respectively. In addition to the recuperation of braking energy, only significant braking resistors or retarder systems are suitable here.

In the case of battery-electrically driven vehicles, a cooling circuit for a braking system is usually already separated from a cooling circuit for cooling a vehicle battery due to the vastly different temperatures, because temperatures of less than 50° C. can usually be present at the battery and at the electronic system, but temperatures of more than 90° Celsius can be present at the braking system.

In the case of motor vehicles comprising a fuel cell, the demand on a cooling system is even significantly higher, because an amount of heat to be dissipated as well as a temperature window of the fuel cell system usually require a maximum cooling system, which is as strong as possible, in the motor vehicle. An additional cooling system for a secondary braking system cannot be readily accommodated in the fuel cell vehicle thereby. It should generally also be noted for this purpose that the cooling systems for motor vehicles comprising fuel cells are generally constructed of a front-side main radiator as well as one or several additional radiators, which can be accommodated in the motor vehicle at different locations.

Moreover, when further looking at fuel cell motor vehicles, there is the problem that in the event that the secondary braking system is arranged in the same cooling circuit as the fuel cell, a special deionized coolant, which is required for the fuel cell, must also be used for the secondary braking system. This coolant is extremely pure and also temperature-sensitive. The demands on the components of the secondary braking system, through which coolant flows, are thus very high. Moreover, no contamination whatsoever of the coolant by means of particles and/or ions must occur in the case of an embodiment of this type even during the operation, which requires a significant additional structural expenditure. A reduction of the presentable heating capacity can furthermore occur in this case because a limit temperature of the fuel cell system generally lies below the limit temperature of the secondary braking system.

If, in contrast, the secondary braking system has a separate cooling circuit, as it is used, for example, in the case of battery-electrical motor vehicles, a contamination of the very pure deionized coolant, which is to be used for the fuel cell system, can be avoided and higher limit temperatures can moreover be accepted, but a separate heat exchanger or radiator, respectively, for the secondary braking system, which requires an installation space, which is not insignificant and which is often not available, in particular in fuel cell vehicles, has to be provided in this case. An integration of an additional radiator plane for the secondary braking system into a heat exchanger, in particular into a cooling module, for the fuel cell impairs the cooling capacity by means of an increased airside resistance, which is likewise not desired.

SUMMARY

The present invention thus deals with the problem of specifying an improved or at least an alternative embodiment, which in particular overcomes the above-mentioned disadvantages, for an electrically driven motor vehicle of the generic type.

This problem is solved according to the invention by means of the subject matter of independent claim(s). Advantageous embodiments are the subject matter of the dependent claim(s).

The present invention is based on the general idea of integrating a cooling system of a secondary braking system into a cooling system for cooling an electrical energy storage or a fuel cell module, respectively, of an electrically driven motor vehicle or vice versa, and to thereby use separate fluid circuits, which, however, are coupled to one another so as to transfer heat, whereby, on the one hand, a contamination of the coolant used to cool the fuel cell module is avoided and different coolant temperatures for the fuel cell module and the secondary braking system can be made possible at the same time, whereby the fuel cell module as well as the secondary braking system can be cooled more individually and thus more effectively. In a known manner, the electrically driven motor vehicle according to the invention has a first cooling circuit comprising at least one first component, which is arranged in the first cooling circuit and the temperature of which is to be controlled, a first heat exchanger, and at least one pump for conveying a coolant, as well as a second cooling circuit comprising a second component, which is arranged therein and the temperature of which is to be controlled. According to the invention it is now provided that the first and second cooling circuit are fluidically separated from one another and are coupled to one another so as to transfer heat via a second heat exchanger. One of the two components is thereby formed as electrical energy storage or as fuel cell module, while the other component is formed as secondary braking system. The advantage of a significantly reduced volume of the specific, deionized coolant for the fuel cell module as well as significantly fewer components or component parts, respectively, which can come into contact with the deionized coolant module, results due to the fluidic separation of the two coolants. An increased robustness of the total system as well as an easier repair and maintenance in the event of a coolant leakage can be attained thereby. Moreover, the solution according to the invention has the large advantage of a lower alternating pressure load of the fuel cell as well as a very high capacity of the secondary braking system.

In the case of an advantageous further development of the solution according to the invention, at least one electrical energy storage or at least one fuel cell module is arranged in the first cooling circuit, and a secondary braking system is arranged in the second cooling circuit. The volume of the first cooling circuit comprising the deionized coolant as well as the number of the component parts, which may come into contact with this deionized coolant and which have to be passivated in a complex manner, can be significantly reduced thereby, whereby a more cost-efficient solution can be created as a whole. By means of the secondary breaking system, which is arranged in the second cooling circuit, it is possible to operate said secondary braking system with a coolant, which is optimized for higher temperatures, and to thus effect a more effective cooling of the secondary braking system. A contamination of the highly sensitive deionized coolant for the fuel cell needs to also not be feared due to the separation of the two cooling circuits.

In the case of an advantageous further development of the solution according to the invention, at least two electrical energy storages or two fuel cell modules, which are connected in parallel in the first cooling circuit, are arranged in the first cooling circuit. The above-mentioned secondary braking system is thereby arranged in the second cooling circuit. This embodiment shows that it goes without saying that several fuel cell modules can also be arranged in the first cooling circuit, and the fluidic separation according to the invention and heat-transferring coupling of the two cooling circuits can thus also be applied to larger fuel cell systems.

In the case of a further advantageous embodiment of the solution according to the invention, a third heat exchanger, which is formed as heater, is arranged in the first cooling circuit. This third heat exchanger can dissipate, for example, heat to an air-conditioning system, and can thus be used for heating up a passenger compartment.

A fourth heat exchanger, which is formed as radiator, is advantageously arranged in the first cooling circuit. In the case of particularly high temperatures, a temporary additional cooling of the coolant in the first cooling circuit and furthermore of the fuel cell is possible via a fourth heat exchanger of this type, and the additional cooling of the secondary braking system is possible via the second heat exchanger of the coolant in the second cooling circuit. It goes without saying that a permanent additional cooling can generally also be represented by means of the fourth heat exchanger. The connection of the fourth heat exchanger is thereby possible, for example, provided that uphill and downhill sections alternate, and the fuel cell as well as the secondary braking system are thus loaded.

In the case of a further advantageous embodiment of the solution according to the invention, a valve, via which a coolant flow in the first cooling circuit can be controlled, for example also interrupted, is arranged in the first cooling circuit. A valve of this type is well known and can be formed, for example, as thermostatic valve, and can prevent an additional cooling in particular when starting the electrically driven motor vehicle or in cold weather, respectively, whereby the fuel cell as well as the secondary braking system achieve their operating temperature more quickly.

In the case of a further advantageous embodiment of the solution according to the invention, at least one fuel cell module has a charge air cooler, which is integrated into the first cooling circuit and which is connected to the latter so as to transfer heat. To generate electricity, the fuel cell of the fuel cell module does not only need hydrogen, but also air, which can be cooled by means of the charge air cooler, whereby an undesirably high heat-up of the fuel cell and thus also a reduction of the efficiency of the fuel cell can be avoided. In addition or in the alternative, at least one fuel cell module can also have a hydrogen heater, which is integrated into the first cooling circuit and which is connected to the latter so as to transfer heat. The hydrogen can be heated up prior to being fed into the fuel cell via a hydrogen heater of this type, which is connected to the first cooling circuit so as to transfer heat, whereby the efficiency of the fuel cell can be increased.

In the case of an alternative embodiment of the electrically driven motor vehicle, a secondary braking system is arranged in the first cooling circuit, and at least one electrical energy storage or at least one fuel cell module is arranged in the second cooling circuit. The second cooling circuit thus serves to cool the fuel cell module or the fuel cell, respectively, or the energy storage in this case, for the purpose of which the temperature-sensitive and deionized coolant is used. The first cooling circuit is separated therefrom with a separate coolant, which is designed for the higher temperatures appearing in the secondary braking system. The idea of the invention is likewise realized in the same way here, whereby only the cooling circuits and the components arranged therein are interchanged.

In the case of an advantageous further development of the solution according to the invention, a third cooling circuit comprising at least one electrical energy storage or a fuel cell module is provided, which is coupled to the first cooling circuit so as to transfer heat via a fifth heat exchanger, but which is fluidically separated from the first cooling circuit and also from the second cooling circuit. In the case of an embodiment of this type, the electrically driven motor vehicle according to the invention thus has two fuel cell modules, which each have a separate cooling circuit, namely the second and third cooling circuit. A cooling of the second and third cooling circuit thus takes place via the second and fifth heat exchanger through the first cooling circuit.

A valve, via which a coolant flow can then be controlled, in particular also interrupted, in the first cooling circuit in this case, in order to prevent an excessive cooling of the secondary braking system as well as of the fuel cell module during a cold start or in the case of cold outside temperatures, respectively, can also be provided in the case of the motor vehicle, which is described in the previous paragraph.

Each of these fuel cell modules can thereby have a separate charge air cooler as well as a separate hydrogen heater, in order to increase the efficiency of the respective fuel cell module and thus of the entire, electrically driven motor vehicle.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations, or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
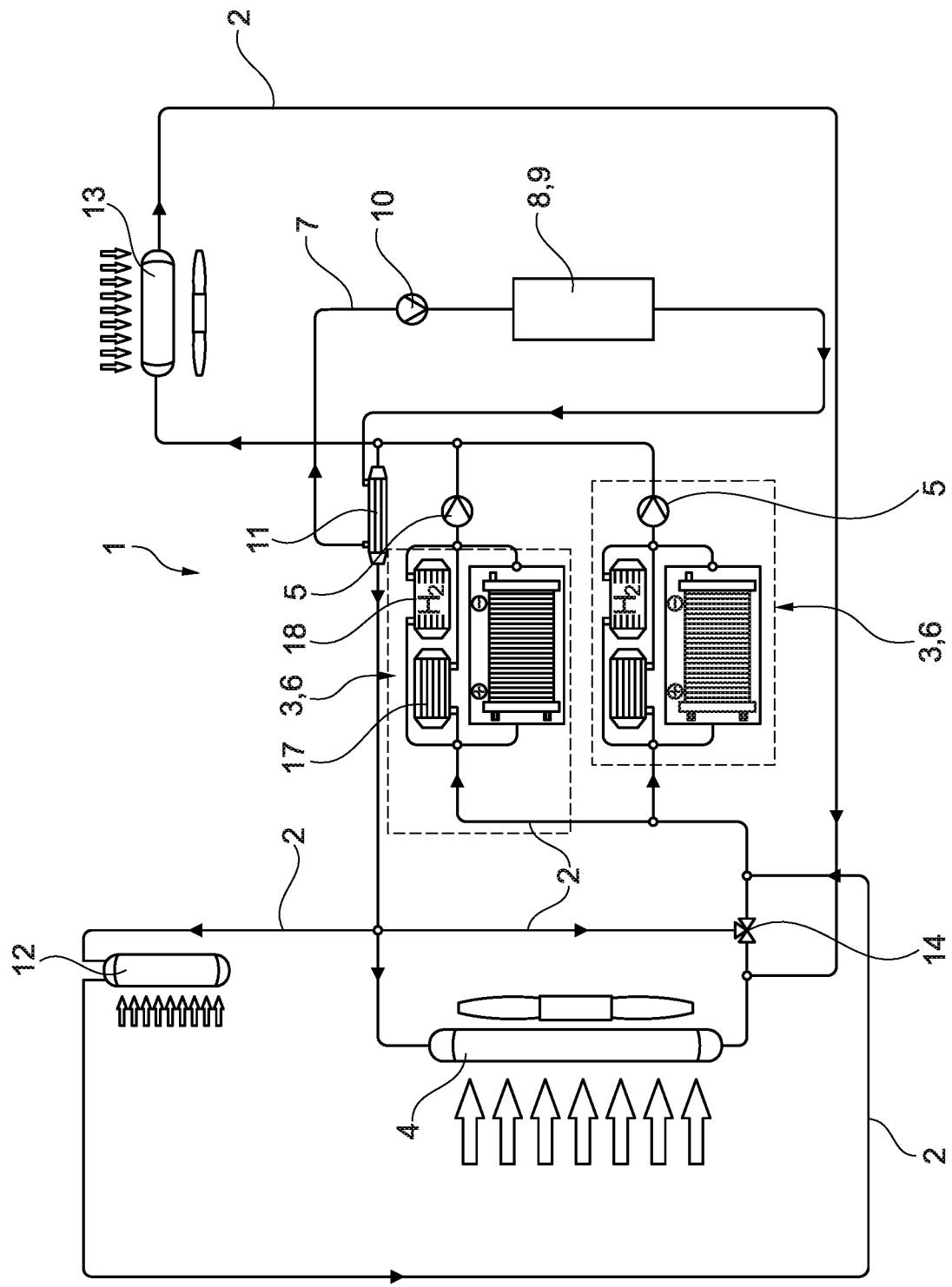
FIG. 1 shows a motor vehicle according to the invention comprising a first and second cooling circuit according to a first embodiment.
Figure 2:
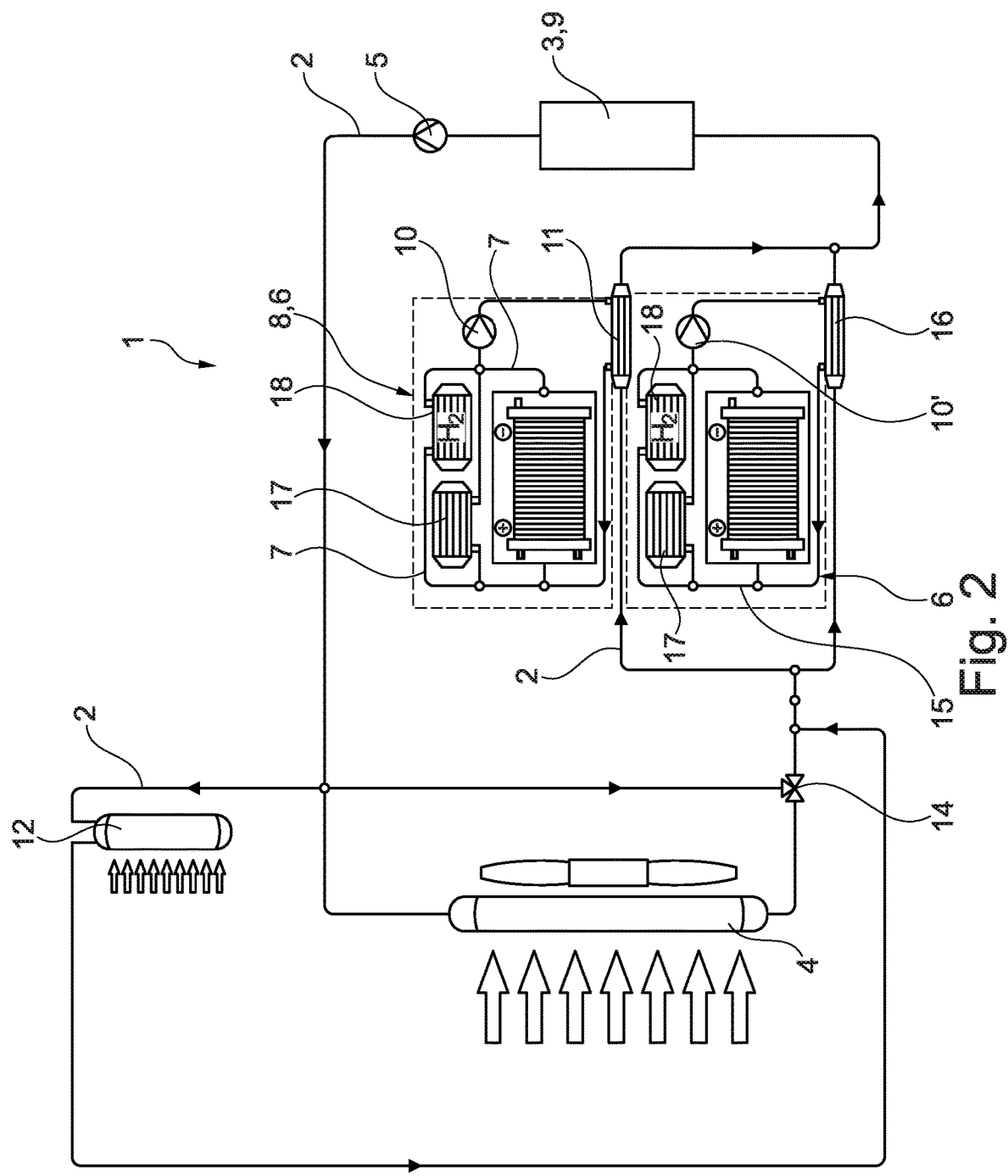
FIG. 2 shows an illustration as in FIG. 1, but in the case of a second embodiment.

According to FIGS. 1 and 2, an electrically driven motor vehicle 1 according to the invention has a first cooling circuit 2 comprising at least one first component 3, which is arranged therein and the temperature of which is to be controlled, as well as a first heat exchanger 4, and at least one pump 5 for conveying a coolant. Reference numeral "2" for the first cooling circuit 2 is thereby drawn several times in FIGS. 1 and 2, in order to be able to better recognize the course of the first cooling circuit 2. According to FIG. 1, the first component 3 is formed as fuel cell module 6, wherein it goes without saying that, in the alternative, an energy storage, for example an electric vehicle battery, can also be used for the first component 3, which has to be held in a predefined temperature window for the improved power output via the first cooling circuit 2. According to FIG. 1, two first components 3 are thereby provided in the manner of fuel cell modules 6, which are connected in parallel in the first cooling circuit 2. It goes without saying that further fuel cell modules 6 of this type can also be arranged in the first cooling circuit 2. What is further provided is a second cooling circuit 7 comprising a second component 8, which is arranged in the second cooling circuit 7 and the temperature of which is to be controlled, and which is formed as secondary braking system 9 in the present case. A pump 10 for conveying the coolant flowing in the second cooling circuit 7 is also provided in the second cooling circuit 7.

According to the invention, the first and second cooling circuit 2, 7 are now fluidically separated from one another and are coupled to one another so as to transfer heat via a second heat exchanger 11. One of the two components 3, 8 is thereby formed as electrical energy storage or as fuel cell module 6, wherein, according to FIG. 1, the first component 3 is formed as fuel cell module 6, while the second component 8 is formed as secondary braking system 9.

When looking at FIG. 2, the first component 3 is formed as secondary braking system 9 there, while the second component 8 is or are formed, respectively, as fuel cell module 6.

When initially looking at FIG. 1, it can be seen that two fuel cell modules 6 are arranged in the first cooling circuit 2—as mentioned above—and a secondary braking system 9 is arranged in the second cooling circuit 7 in the case of the embodiment shown therein. A third heat exchanger 12, which is formed as heater and via which, for example, a passenger interior of the electrically driven motor vehicle 1 can be heated, is furthermore arranged in the first cooling circuit 2. A fourth heat exchanger 13, which is formed as radiator and which can be connected in response to a temporarily increased cooling capacity, is furthermore arranged in the first cooling circuit 2 according to FIG. 1.

What is likewise provided is a valve 14, via which a coolant flow can be controlled, for example also stopped, in the first cooling circuit 2. A valve 14 of this type can be formed, for example, as thermostatic valve, and makes it possible to not additionally cool the fuel cell module 6 as well as the secondary braking system 9 in particular under cold outside conditions.

When now looking at FIG. 2, it can be seen that a secondary braking system 9 is arranged in the first cooling circuit 2 there, and two fuel cell modules 6 are arranged in the second cooling circuit 7. The first component 3 is thus formed as secondary braking system 9 and the second component 8 as fuel cell module 6 in this case.

According to FIG. 2, a third cooling circuit 15 comprising at least one third component, here comprising a fuel cell module 6, is moreover also provided, which is coupled to the first cooling circuit 2 via a fifth heat exchanger 16, but which is fluidically separated therefrom, as well as from the second cooling circuit 7.

In the case of the electrically driven motor vehicle 1, which is illustrated according to FIG. 2, a third heat exchanger 12, which is formed as heater, is also provided in the first cooling circuit 2, as well as a valve 14, which, in the closed state, stops a flow of the coolant in the first cooling circuit 2.

According to FIG. 1, a separate pump 5, which serves for the coolant conveyance in the first cooling circuit 2, is provided for each fuel cell module 6. Only a single pump 10 is arranged in the second cooling circuit 7. According to FIG. 2, only a single pump 5 is provided in the first cooling circuit 2, while a pump 10 is assigned to each further cooling circuit, that is the second cooling circuit 7, and a pump 10' is assigned to the third cooling circuit 15.

The fuel cell modules 6 have a charge air cooler 17, which, according to FIG. 1, are integrated into the first cooling circuit 2, while the charge air cooler 17 according to FIG. 2 is integrated into the second cooling circuit 7 in the upper fuel cell module 6, and is integrated into the third cooling circuit 15 in the lower fuel cell module 6. Hydrogen heaters 18, which heat up the hydrogen prior to the supply into the fuel cell of the fuel cell module 6 and thus effect a more effective combustion, are in each case integrated in the same way. The charge air supplied to the combustion in the fuel cell can be cooled via the charge air cooler 17 and can thus be compressed, so that more air is available for the combustion, and the fuel cell module 6 can thus have a higher output.

The hydrogen heater 18 according to FIG. 1 is thereby connected to the first cooling circuit 2 so as to transfer heat in the case of the two fuel cell modules 6, while the hydrogen heater 18 is coupled to the second cooling circuit 7 in the case of the upper fuel cell module 6 according to FIG. 2, and to the third cooling circuit 15 in the case of the lower fuel cell module 6 so as to transfer heat.

It is possible by means of the motor vehicle 1 according to the invention to integrate a secondary braking system 9 into the cooling system of a fuel cell module 6 or generally of an electrical energy storage, respectively, and to thereby prevent the problematic use of a common coolant as well as to individually and thus significantly better cool the individual components 3, 8 with regard to the coolant temperature thereof. Due to the separation of the coolants of the first cooling circuit 2 and of the second cooling circuit 7 or of the third or further cooling circuit 15, respectively, the coolant volume for the first cooling circuit 2, in which the fuel cell module 6 or an energy storage, respectively, is arranged, can be reduced significantly, whereby in particular less deionized coolant has to be provided as well, and fewer regions, which come into contact with this coolant and which would need to be passivated, are present. Due to the different coolants, they can also be used at different temperatures, so that the secondary braking system 9 can be cooled with a coolant temperature of above 90° C., while the fuel cell module 6 can be cooled with a coolant temperature of below 50° C. A cooling, which is particularly suitable, of the fuel cell module 6 as well as of the secondary braking system 9 can be attained thereby.

The invention claimed is:

1. An electrically driven motor vehicle, comprising:
   a first cooling circuit;
   at least one first component arranged in the first cooling circuit and a temperature of which is to be controlled;
   a first heat exchanger;
   at least one pump configured to convey a coolant;
   a second cooling circuit;
   a second component arranged in the second cooling circuit and a temperature of which is to be controlled;
   wherein the first cooling circuit and the second cooling circuit are fluidically separated from one another and are coupled to one another to transfer heat via a second heat exchanger;
   wherein the at least one first component is configured as a fuel cell module;
   wherein the second component is configured as a secondary braking system; and
   wherein the fuel cell module includes at least one of a charge air cooler and a hydrogen heater, which is integrated into the first cooling circuit and which is connected to the first cooling circuit to transfer heat.

2. The electrically driven motor vehicle according to claim 1, wherein:
   the at least one first component includes two first components; and
   the two first components are configured as two fuel cell modules connected in parallel in the first cooling circuit.

3. The electrically driven motor vehicle according to claim 1, further comprising a third heat exchanger configured as a heater and arranged in the first cooling circuit.

4. The electrically driven motor vehicle according to claim 3, further comprising a fourth heat exchanger configured as a radiator and arranged in the first cooling circuit.

5. The electrically driven motor vehicle according to claim 1, further comprising a valve, via which a coolant flow in the first cooling circuit is controllable, arranged in the first cooling circuit.

6. The electrically driven motor vehicle according to claim 1, further comprising a third cooling circuit including at least one of at least one electrical energy storage and at least one fuel cell module, wherein:
   the third cooling circuit is coupled to the first cooling circuit to transfer heat via a third heat exchanger; and
   the third cooling circuit is fluidically separated from the first cooling circuit and the second cooling circuit.

7. The electrically driven motor vehicle according to claim 6, further comprising a fourth heat exchanger configured as a heater and arranged in the first cooling circuit.

8. The electrically driven motor vehicle according to claim 6, wherein:
   the third cooling circuit includes the at least one fuel cell module; and
   the at least one fuel cell module includes at least one of a charge air cooler and a hydrogen heater, which is integrated into the third cooling circuit and which is connected to the third cooling circuit to transfer heat.

9. The electrically driven motor vehicle according to claim 1, wherein
   the fuel cell module includes the charge air cooler.

10. The electrically driven motor vehicle according to claim 1, wherein
    the fuel cell module includes the hydrogen heater.

11. An electrically driven motor vehicle, comprising:
    a first cooling circuit;
    at least one first component arranged in the first cooling circuit, the at least one first component having a first controllable temperature;
    a first heat exchanger arranged in the first cooling circuit;
    a first pump configured to convey a coolant through the first cooling circuit;
    a second cooling circuit fluidically separated from the first cooling circuit;
    a second component arranged in the second cooling circuit, the second component having a second controllable temperature;
    a second pump configured to convey a coolant through the second cooling circuit;
    a third cooling circuit fluidically separated from the first cooling circuit and the second cooling circuit;
    at least one of an electrically energy storage and a fuel cell module arranged in the third cooling circuit;
    a third pump configured to convey a coolant through the third cooling circuit;
    a second heat exchanger arranged in the first cooling circuit and the second cooling circuit;
    a third heat exchanger arranged in the first cooling circuit and the third cooling circuit;
    the first cooling circuit and the second cooling circuit coupled to one another to facilitate a transfer of heat therebetween via the second heat exchanger;
    the first cooling circuit and the third cooling circuit coupled to one another to facilitate a transfer of heat therebetween via the third heat exchanger; and
    wherein one of:
      the at least one first component is configured as a fuel cell module, and the second component is configured as a secondary braking system; and
      the at least one first component is configured as a secondary braking system, and the second component is configured as a fuel cell module.

12. The electrically driven motor vehicle according to claim 11, wherein:
    the at least one first component is configured as the fuel cell module; and
    the second component is configured as the secondary braking system.

13. The electrically driven motor vehicle according to claim 11, wherein:
    the at least one first component is configured as the secondary braking system; and
    the second component is configured as the fuel cell module.

14. The electrically driven motor vehicle according to claim 13, further comprising a valve, via which a coolant flow in the first cooling circuit is controllable, arranged in the first cooling circuit.

15. The electrically driven motor vehicle according to claim 13, wherein
    the fuel cell module arranged in the second cooling circuit includes at least one of a charge air cooler and a hydrogen heater, which is integrated into the second cooling circuit and which is connected to the second cooling circuit to transfer heat.

16. The electrically driven motor vehicle according to claim 11, further comprising a heater arranged in the first cooling circuit.

17. The electrically driven motor vehicle according to claim 11, further comprising a radiator arranged in the first cooling circuit.

18. The electrically driven motor vehicle according to claim 11, wherein:
the fuel cell module is arranged in the third cooling circuit; and
the fuel cell module arranged in the third cooing circuit includes a hydrogen heater, which is integrated into the third cooling circuit and which is connected to the third cooling circuit to transfer heat.

19. An electrically driven motor vehicle, comprising:
a first cooling circuit;
at least two first components arranged in the first cooling circuit, the at least two first components each having a first controllable temperature;
a first heat exchanger arranged in the first cooling circuit;
a first pump configured to convey a coolant through the first cooling circuit;
a second cooling circuit fluidically separated from the first cooling circuit;
a second component arranged in the second cooling circuit, the second component having a second controllable temperature;
a second pump configured to convey a coolant through the second cooling circuit;
a second heat exchanger arranged in the first cooling circuit and the second cooling circuit;
the first cooling circuit and the second cooling circuit coupled to one another to facilitate a transfer of heat therebetween via the second heat exchanger;
wherein the at least two first components are configured as two fuel cell modules connected in parallel in the first cooling circuit; and
wherein the second component is configured as a secondary braking system.

20. The electrically driven motor vehicle according to claim 19, further comprising:
a third cooling circuit that is fluidically separated from the first cooling circuit and the second cooling circuit;
at least one of (i) at least one electrical energy storage and (ii) at least one fuel cell module arranged in the third cooling circuit; and
a third heat exchanger via which the third cooling circuit is coupled to the first cooling circuit to transfer heat.

* * * * *

UNITED STATES PATENT AND TRADEMARK OFFICE
CERTIFICATE OF CORRECTION

| | |
|---|---|
| PATENT NO. | : 11,807,069 B2 |
| APPLICATION NO. | : 17/522815 |
| DATED | : November 7, 2023 |
| INVENTOR(S) | : Rainer Lutz |

It is certified that error appears in the above-identified patent and that said Letters Patent is hereby corrected as shown below:

In the Claims

At Column 9, Claim number 18, Line number 8, delete "cooing" and replace with "cooling".

Signed and Sealed this
Second Day of January, 2024

*Katherine Kelly Vidal*

Katherine Kelly Vidal
*Director of the United States Patent and Trademark Office*